(No Model.)
J. F. SOSNOWSKI.
AXLE.
No. 598,717. Patented Feb. 8, 1898.
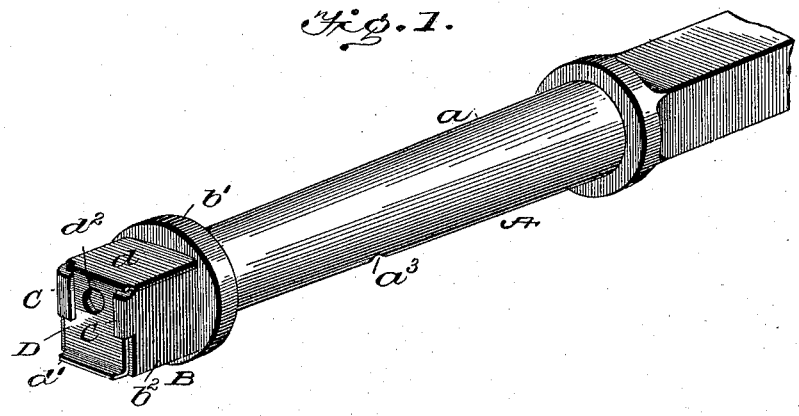
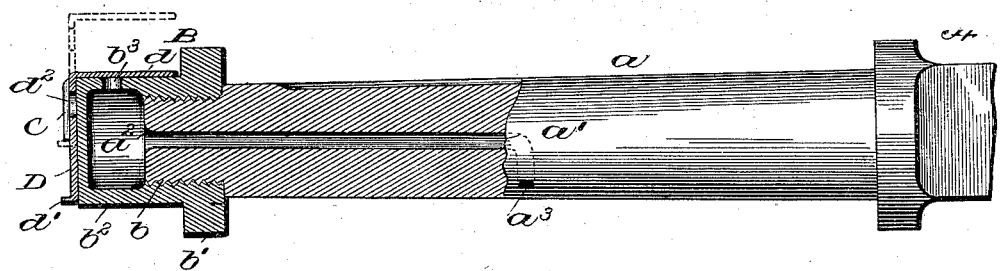
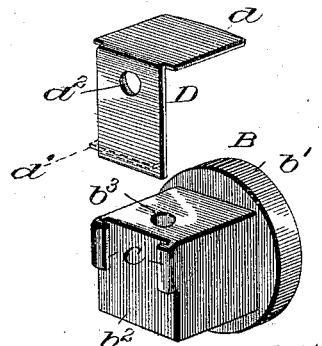
Witnesses
John Imrie
Wm. S. Hodges
Inventor
J. F. Sosnowski.
by Jarvis Arnold
Attorney

UNITED STATES PATENT OFFICE.

JOHN F. SOSNOWSKI, OF WADMALAW ISLAND, SOUTH CAROLINA.

AXLE.

SPECIFICATION forming part of Letters Patent No. 598,717, dated February 8, 1898.

Application filed March 31, 1897. Serial No. 630,166. (No model.)

*To all whom it may concern:*

Be it known that I, JOHN F. SOSNOWSKI, of Wadmalaw Island, in the county of Charleston and State of South Carolina, have invented certain new and useful Improvements in Axles; and I do hereby declare the following to be a full, clear, and exact description of the invention, such as will enable others skilled in the art to which it appertains to make and use the same.

This invention relates to certain new and useful improvements in axles; and it has for its object the production of a self-lubricating axle which will be simple and inexpensive in construction and efficient in operation.

In carrying out my invention the axle-arm is provided with a longitudinal bore leading in from the end thereof in a slanting direction, said bore intersecting a hole or opening leading in from the surface of said axle-arm near the center thereof. A hollow nut or the like is removably secured to the threaded end of the axle-arm, said nut forming an oil-chamber coincident with said longitudinal bore. A hole or opening is formed in one face of said nut to allow lubricant to enter to said chamber, said hole or opening being normally closed by a sliding cover, which is also provided with a hole or opening coincident with the opening in said nut to allow of the ready insertion of the spout of an oil-can or the like, whereby said chamber may be filled with lubricant.

The invention will be hereinafter fully set forth, and particularly pointed out in the claims.

In the accompanying drawings, Figure 1 is a view in perspective illustrating my invention. Fig. 2 is a longitudinal sectional view. Fig. 3 is an enlarged view of the nut detached.

Referring to the drawings, A designates my improved axle as an entirety, the axle-arm $a$ thereof being provided with a slanting longitudinal bore $a'$, leading in from the end $a^2$ thereof and intersecting a transverse hole or opening $a^3$ formed therein.

To the outer reduced threaded end $b$ of the axle-arm is secured a nut B, said nut being provided with a bearing-flange $b'$ and a hollow squared extension $b^2$, forming a chamber or reservoir for the lubricant, a hole or opening $b^3$ being formed in the squared portion of said nut for the purpose of feeding oil or other lubricant to said chamber. On the outer face of the nut B are formed lugs or guideways C, having coincident grooves therein for the reception of a plate D, which is provided with an upper enlarged right-angular portion $d$, adapted to cover the top face of said nut and normally close the opening $b^3$ therein. Said plate is adapted to slide up and down in said guideways, the upward movement thereof being limited by a flange or struck-up portion $d'$. A hole or opening $d^2$ is formed in the vertical portion of said plate, whereby when the latter is raised an oil-can spout or the like may be passed therethrough to the opening $b^3$ of the nut and allow the chamber thereof to be completely filled or charged without necessitating the removal of either the wheel or the nut.

In practice the wheel is first secured in position and the nut screwed home, the threads thereof being so cut as to bring the face with the hole or opening $b^3$ therein to the top. The plate D is then raised and the chamber or reservoir of the nut filled or charged with the lubricant, which latter will pass through bore $a'$ and opening $a^3$ to the hub of the wheel, keeping the latter well lubricated.

The advantages of my invention are at once apparent to those skilled in the art to which it appertains. It will be particularly observed that the axle is self-oiling and that the removal of the wheel or the nut is unnecessary when it is desired to recharge the oil reservoir or chamber; that by means of the plate or cover for the oil-openings all dust, grit, and the like are kept from the bearings, and that the parts are simple and inexpensive in construction and not liable to readily get out of order or become deranged.

I claim as my invention—

1. The herein-described nut having an interior chamber provided with an inlet-opening, and a vertically-movable plate secured to said nut and adapted to close said inlet-opening, said plate also having a hole or opening therein, whereby oil can be conducted to said inlet-opening when said plate is elevated, substantially as set forth.

2. The herein-described nut having an interior chamber provided with an inlet-opening, and a vertically-movable plate secured to said nut and having a right-angular flange or projection adapted to cover said inlet-opening, said plate also having a hole or opening in its vertical portion, whereby oil can be conducted to said inlet-opening when said plate is elevated, substantially as set forth.

3. The combination with an axle having a longitudinal bore therein, of a nut adapted to be secured on the end of said axle and having a chamber or reservoir communicating with said bore, an inlet hole or opening being provided for said chamber, lugs or guideways formed on the rear face of said nut, a plate mounted in said guideways and having a right-angular portion adapted to normally cover said hole or opening, a hole or opening being formed in the vertical portion of said plate and adapted for insertion of a spout to convey oil into said former hole or opening, and means for limiting the upward movement of said plate, substantially as set forth.

In testimony whereof I have signed this specification in the presence of two subscribing witnesses.

JOHN F. SOSNOWSKI.

Witnesses:
W. E. DUFFUS,
T. M. HUSELL.